July 3, 1923.
G. W. TOWNSEND
DEVICE FOR MAKING ARMATURE COILS
Filed July 12, 1921
1,460,737
2 Sheets-Sheet 1
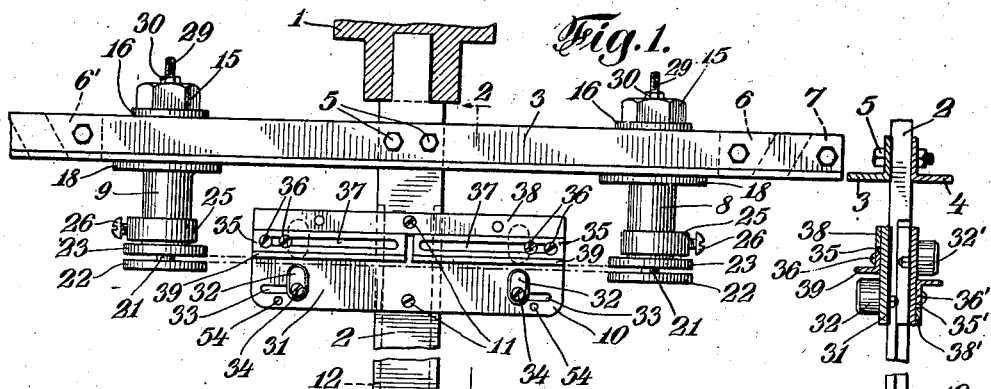
Fig.1.
Fig.2.
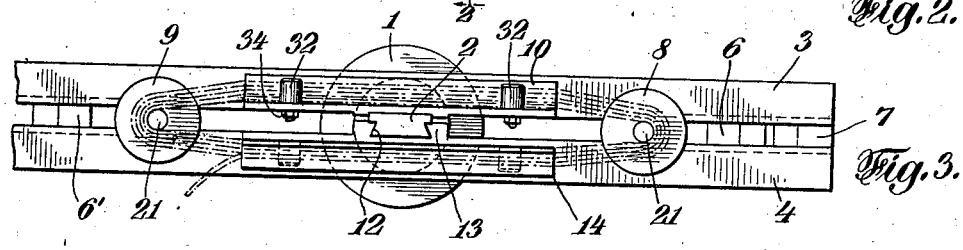
Fig.3.
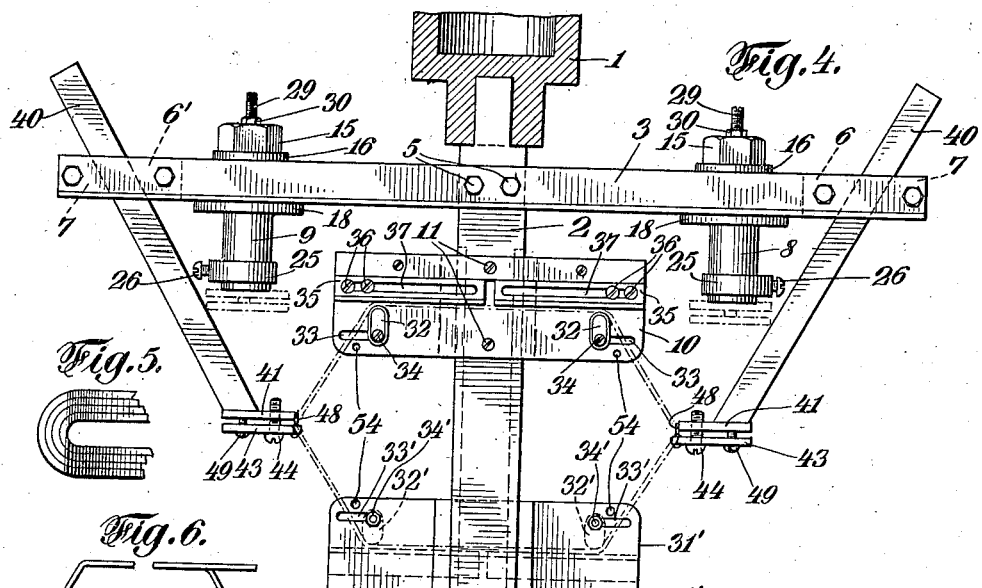
Fig.4.
Fig.5.
Fig.6.
Inventor
George W. Townsend
By his Attorney July 3, 1923.
G. W. TOWNSEND
DEVICE FOR MAKING ARMATURE COILS
Filed July 12, 1921
1,460,737
2 Sheets-Sheet 2
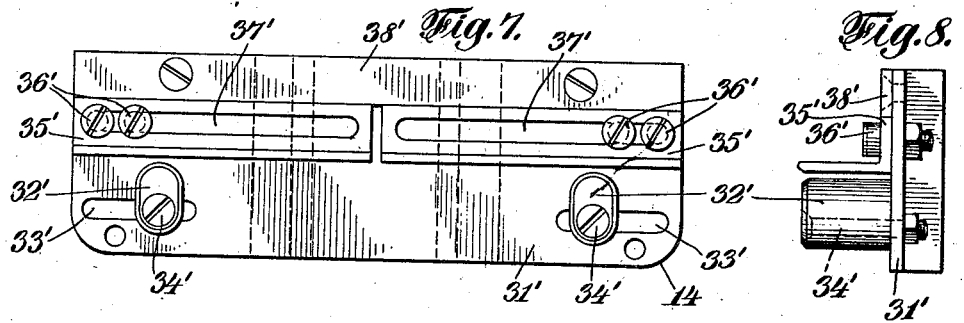
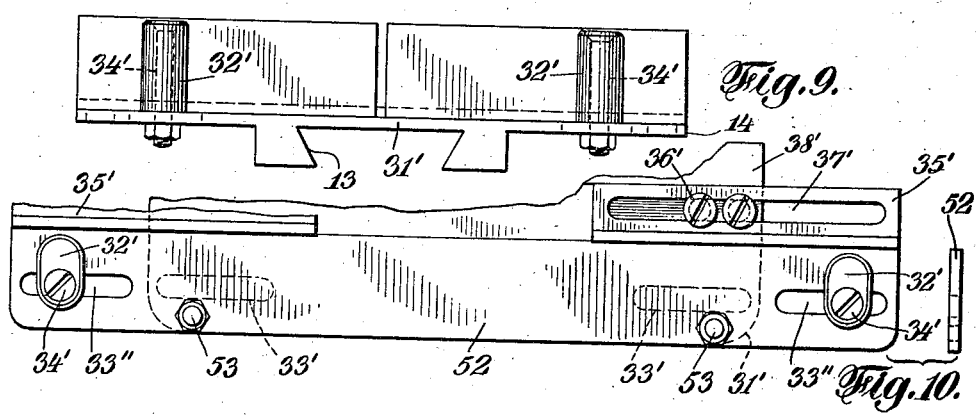
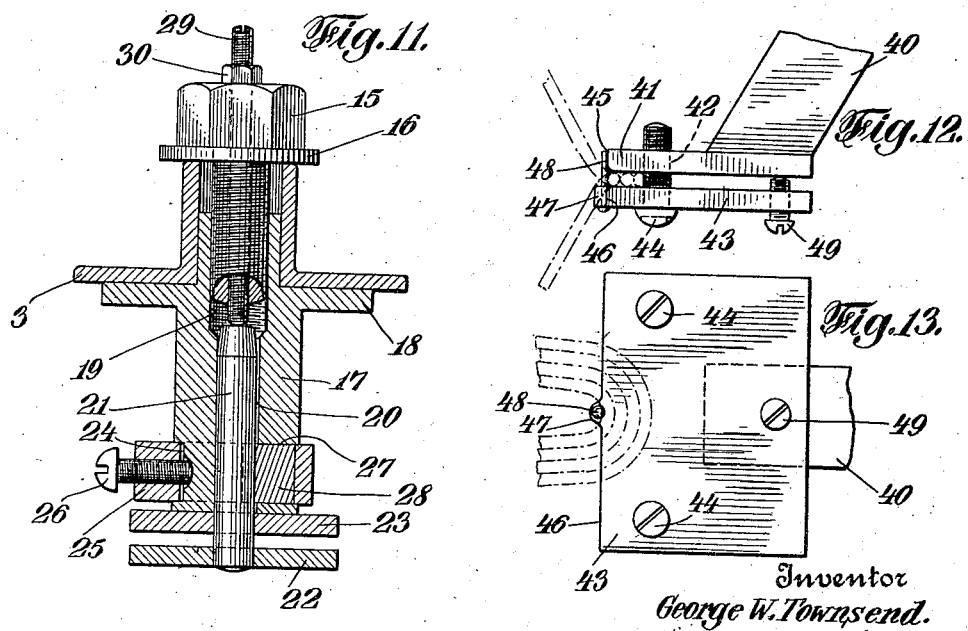
Inventor
George W. Townsend.
By his Attorney Patented July 3, 1923.

1,460,737

UNITED STATES PATENT OFFICE.

GEORGE W. TOWNSEND, OF ST. ALBANS, NEW YORK.

DEVICE FOR MAKING ARMATURE COILS.

Application filed July 12, 1921. Serial No. 484,067.

*To all whom it may concern:*

Be it known that I, GEORGE W. TOWNSEND, a citizen of the United States, and resident of Park Place, St. Albans, in the county of Queens and State of New York, have invented certain new and useful Improvements in Devices for Making Armature Coils, of which the following is a specification.

This invention relates to a device for producing improved armature coils.

Heretofore armature coils for dynamoelectric machines have been known to be produced by shaping them on so-called forming blocks, and there have been various improvements invented for overcoming the old method of producing the form-wound armature coils.

The present invention treats a similar subject but comprises marked improvements over the new developed methods now in use, and due to these improvements my method differs fundamentally from the present employed methods, in so far that, after wire has been wound on winding posts, forming a plane coil, the latter is released from the device upon which the wire, forming the coil, has been wound preparatory to opening the coil. The end loops or noses of the plane coil are reclamped so that the wire loops are held together during the opening operation in such a manner that the wire between the noses is bent at a clamping line, which coincides with the tangent passing through the outermost point of the inner periphery of the smallest wire loop of the noses, which point lies in the longitudinal center line of the original plane coil.

The coil produced by the above method has many advantages over any coil heretofore produced. One of these advantages is that the long noses resulting from the heretofore employed methods of forming coils are entirely eliminated by my process, thereby saving space in the manufacture of motors or dynamos. Aside from this fact, coils produced by method are exactly alike in shape and dimensions, when a plurality of coils is produced at one setting of the device by which my method is facilitated.

My machine for producing coils according to my method comprises several new improvements, by means of which the plane wound coil may be readily released from the winding posts, and includes means by way of which the released plane coils may be clamped in the manner described above preparatory to opening the coils to their final shape.

The main objects of my invention are to provide an improved method of forming armature coils, to provide a novel form of an armature coil, to provide a device by means of which such coil may be formed while employing my new method, to provide within such a device means for forming a plane coil, which means are adapted to facilitate the removing of the plane coil, and to provide means for clamping the noses or end loops of the plane coil preparatory to opening the coil, so that during the operation of opening, the wires are bent at a tangent passing through the outermost peripheral point of the inner curvature of the smallest wire loop of the coil noses.

The foregoing and other objects will be more fully apparent from the following description and the accompanying drawing, forming a part of this specification, and in which:

Fig. 1 is a partial top view of a preferred form of my device.

Fig. 2 is a sectional view taken on line 2—2 of Fig. 1.

Fig. 3 is an end elevation of my device.

Fig. 4 is a top view of my device as seen during the process of spreading or opening the coil.

Fig. 5 is an enlarged detail of the nose of the coil.

Fig. 6 is a top view of the coil formed by my method.

Fig. 7 is a top view of a wire guide.

Fig. 8 is an end view thereof.

Fig. 9 is an elevation of a preferred form of a wire guide.

Fig. 10 represents a wire guide with an exchangeable extending member.

Fig. 11 is a cross sectional view taken through a preferred form of a winding post.

Fig. 12 is a top view of the coil nose clamping means.

Fig. 13 is a front elevation thereof.

Referring to the drawings, numeral 1 indicates the rotatable head of my device in which is secured a central or guide bar 2. Associated therewith in near proximity to head 1 is a guide frame, comprising two angle iron bars 3 and 4 secured by any convenient means to central bar 2, as indicated at 5.

The angle irons are spaced by bar 2 and by end blocks 6 and 7, and 6' and 7', also bolted or otherwise held in permanent connection with angle irons 3 and 4.

In the free space between the two bars there are provided winding posts, indicated at 8 and 9, and shown in detail in Fig. 11. Permanently associated with the rotatable member or central bar 2, is a wire guide 10, held in place by screws 11 or in any other convenient manner.

The rotatable member 2 is preferably provided with a dovetail guide 12 for receiving a corresponding guide portion 13 of wire guide 14, the latter being similarly constructed as wire guide 10, as shown in detail in Figs. 7, 8, and 9.

The winding posts are adjustable within the slot produced between the angle bars 3 and 4, and may be clamped in any desired position by means of a bolt 15, the head of which bears against a washer 16, which washer abuts with the horizontal legs of bars 3 and 4. The main member or body of the post 17 is provided with a flange 18, which bears against the other legs of angle bars 3 and 4.

The main member is bored and threaded as indicated at 19 to receive the screw portion of bolt 15, by means of which the main member is clamped to the angle guide frame.

Forming a continuation of the threaded bore of the main member is a reduced bore 20 for receiving the pin 21 of wire receiving means, which comprise the pin 21, a washer-like flange 22 permanently attached to said pin, and another washer-like flange 23 adapted to slide upon the pin. As may be seen in the drawing, the pin is slightly smaller in diameter than bore 20, the purpose of which will be explained presently.

The free end of main stock 17 is provided with an annular groove, indicated at 24 for receiving a clamp 25 provided with a clamp screw 26, adapted to bear against the recessed portion of main stock 17.

Opposite to the bearing point of the screw, there is provided in the recessed portion of the main stock, a cut-out indicated at 27 into which fits a movable block 28 adapted to bear against pin 21, and so arranged within the clamp 25 as to facilitate its being moved toward pin 21 by the clamp when screw 26 is tightened.

In this manner pin 21 may be clamped somewhat out of center of bore 20, the latter's center line coinciding with the longitudinal center line of main stock 17.

For adjusting the distance between washers 22 and 23, pin 21 may be set to desired position by a screw 29 provided at the center of bolt 15 and adapted to be held in place by lock nut 30. The feature of clamping pin 21 somewhat out of center within bore 20 becomes of importance in producing my armature coils, according to my novel process.

Referring to Figs. 1 and 2, it will be seen that when wire is wound from any convenient source, as for instance a bobbin, around the winding posts 8 and 9, the tension of the wire caused by the winding process tends to bring the winding posts toward each other.

Now, according to my process, when the plane coil, formed upon the winding posts and held by the wire receiving devices, is to be removed, the tension between these devices would, if not prevent, at least make difficult their removal if they would be unmovably associated with the winding posts, as is the case in similar machines used heretofore. It is obvious that while under tension these devices (pin 21, washers 22 and 23) could be removed only by driving them out by force from the main stock 17, which not only would be inconvenient, but may affect the proper formation, particularly the opening of the coil.

The above disadvantages are eliminated by providing a loose fit between pin 21 and bore 20 of main stock 17. Due to this construction, I am able to set pin 21, prior to winding the coil, out of center relative to bore 20 by means of set crews 26, so that the pins are moved outwards in the direction from the longitudinal center line of the guide bar 2. When the pins 21 are thus set, the plane coil is formed. Prior to removing the plane coil from the posts, set screws 26 are released, permitting pins 21 to move toward each other, thus relieving the tension between the posts and the end noses of the coil, and facilitating the removal of the coil from pins 21.

As has been mentioned before a wire guide 10 is permanently attached to the center or guide bar 2, and comprises in one of the preferred forms shown in my drawings, a plate 31, provided with adjustable blocks 32 adapted to be set at any desired position in slots 33 by means of set screws 34. Facing the blocks are angular guides 35 slidably mounted upon plate 31 and guided by means of screws 36 and longitudinal slots 37 and a guide bar 38 permanently associated with plate 31.

According to the thickness of the wires or the width of the future coil, the adjustable blocks 32 are positioned at a proper distance from the upturned legs 39 of angular guide 35. Slidably associated and disposed at the opposite face of center or guide bar 2 is the other wire guide 14, which is similar in construction to wire guide 10, comprising also a plate 31', having adjustable blocks 32, slidably mounted in slots 33' and held in place by means of bolts 34'. The blocks face adjustable angular guides 35' which again are secured to plate 31' by means of screws 36' passing through guide slots 37'.

The guide bar 38' permanently attached to the plate 31' assures the alinement of the angular guides 35'. The plate 31' is enlarged at its bottom portion, which enlarged portion receives a dovetail cut out 13 corresponding with the dovetail guide 12 of the central bar 2.

When winding the plane coil, the wire guides 10 and 14 are placed in alinement with each other as indicated in Fig. 1, so that the spaces between the guide blocks 32 and 32', respectively, and the angular guides 35 and 35', respectively, are in alinement with the spaces between washers 22 and 23 of the winding posts.

Following the aforementioned adjustment of the machine, a wire or a plurality of wires are temporarily attached to one of the winding posts. Now head 1 and thereby central guide bar 2 are rotated about their axis, and the wire or wires paid out from a bobbin or wire drum, also disposed in alinement with the wire guides and the winding posts, and are wound between the latter until the desired number of loops are formed. In this manner plane coils are produced.

Prior to forming the plane coil set screws 26 are tightened against main stock 17 so that pins 21 are moved in outward direction from the center guide bar 2. When the plane coil is formed, screws 26 are turned in opposite direction, thus loosening the pins 21 in bore 20. Now pins 21 and washers 23 are removed and clamps, similar to those shown in detail in Figs. 12 and 13, take the place of the washers and pins.

These clamps consist of bars 40 (Fig. 4) guided between the oblique faces of blocks 6 and 7, and 6' and 7', respectively, and held between the guide frame consisting of angle irons 3 and 4.

The clamp device itself comprises a stationary clamping plate 41 forming part of bars 40 and provided with two threaded apertures 42. Registering in size with plate 41, is a detachable plate 43 equipped with two clamping screws 44, adapted to engage the threaded apertures 42 of the stationary plate 41. The edges 45 and 46 of clamping plates 41 and 43 respectively, are alined with each other, as clearly shown in Fig. 12, and the inner corners of the edges are preferably, but no necessarily, rounded.

At about the center of edge 46 of plate 43, there is provided an extension 47, integral with plate 43, in which is secured a pin 48 also in alinement with edges 45 and 46. An adjusting screw 49 is also provided in plate 43 and bears against the inner face of plate 43, facilitating tilting or otherwise adjusting plate 43 relative to plate 41.

When the plane coil has been taken off from winding posts 8 and 9, having removed pins 21 and washers 23, the end loops or noses of the thus produced coil, indicated in broken lines in Figs. 1 and 2, are clamped between the plates 41 and 43 in such a manner that pins 48 bear against the smallest inner wire loop of the noses, and the faces 45 and 46 of the plates lie in a tangential plane passing through the outermost point at the periphery of the smallest loop—that is at the point where the loops bear against pins 48, which point lies in the longitudinal center axis of the plane coil. The wire loops increasing in size from the smallest inner loop to the outer loop of the coil, forming the noses of the coil, are firmly clamped in between plates 41 and 43, preparatory to opening the coil in the manner indicated in Fig. 4.

This operation is accomplished by pulling the slidable wire guide 14 in the direction of the arrow, shown in Fig. 4. The substantially free wire portions of the coil lie between the two clamps and are thus shaped to the desired form and bent at the edges 45 and 46 of plates 41 and 43, respectively, at a tangent passing through the outermost peripheral point of the inner curvature of the smallest wire loop of the coil noses.

In this manner a greatly improved coil shape is produced, having very short noses compared with coils produced heretofore, which have the noses unnecessarily extend in length from the coil, due to the fact that the spreading, forming, or opening of the plane coil is performed while the coil is held in its winding posts and not reclamped in the manner I have developed.

As clearly seen in Figs. 5 and 6, a neat looking coil 50 is produced, having short noses 51, which are not longer than the width of the coil material.

In order to facilitate forming various sizes of coils, I have provided exchangeable extension plates 52, indicated in Fig. 10, provided with slots 33'' for receiving adjustable blocks 32. These plates may be of any desired length and are attachable to plates 31 or 31' by means of bolts 53, passing through suitable holes 54, provided in the extension plates. These extension plates are so arranged as to abut with angular wire guides 35 and 35' respectively.

While I have shown a specific construction of my device, and explained my method of forming armature coils in a specific manner, be it understood that changes, and improvements may be made in either without departing from the broad scope of my invention, for which I claim:—

1. In an armature coil winding device, a rotatable member for winding a plane coil, and individual means for clamping and holding the ends of the plane coil after removing it from said rotatable member and preparatory to opening the coil.

2. In an armature coil winding device, a rotatable member having winding posts for facilitating winding a plane coil and guided means for clamping the ends of said plane coil when released from said posts, preparatory to opening the coil.

3. In an armature coil winding device, a rotatable member having adjustable, relatively stationary winding posts for facilitating the forming of a plane coil, and guided, movable means for clamping the ends of said plane coil when released from said posts and during the operation of opening the coil.

4. In an armature coil winding device, a rotatable member, comprising a central bar, a guide frame, adjustable winding posts associated with said frame, a stationary and a movable wire guide mounted upon said central bar; removable clamping means slidably mounted and guided at the ends of said guide frame, said clamping means adapted to receive the ends of the plane coil wound around the winding posts when said coil is detached from said posts preparatory to being opened.

5. In an armature coil winding device, a coil winding post, means associated with the latter for releasing the tension due to winding a plane coil, preparatory to slipping the coil from the winding post.

6. In an armature coil winding device composed of a coil winding post having a wire receiving means capable of changing their position in outward or inward direction relative to the center of the coil, an individual coil end clamping device adapted to receive and hold the arcuated portions of a coil when released from its winding posts, and preparatory to spreading the coil.

7. In an armature coil winding device composed in parts of a coil winding post, comprising a main member, means for attaching it, a wire receiving member held within said main member, means for adjusting said wire receiving member axially, and means for adjusting it transversally; an individually adjustable coil end clamping device adapted to receive and to hold the arcuated portions of a coil when the latter is released from said winding post preparatory to spreading the coil.

8. In an armature coil winding device, a coil winding post comprising a centrally bored main member, means for attaching it, a wire receiving member composed of a flanged pin adapted to pass into the bore of said main member, and a washer provided with an aperture for receiving the pin, means for adjusting the position of said pin in axial direction within the main member, and means for clamping the pin within the main member, said clamping means adapted to hold the pin eccentrically relative to said main member when so desired.

9. In an armature coil winding device having a rotatable member provided with winding posts for forming a plane coil, a pair of individual coil nose clamps for receiving and holding the noses or end loops of a plane coil when opening the plane coil after removing it from said winding posts.

10. In an armature coil winding device, a coil nose clamp adapted to clamp the noses or end loops of a plane coil during the period of opening the coil and comprising a guide member having a stationary jaw, and an adjustable and removable jaw, a coil adjusting pin provided in the latter jaw, said clamp jaws adapted to provide a bending edge for the coil noses which edge is disposed at a tangent passing through the outermost point of the inner curvature of the nose, said point lying in the longitudinal center line of the plane coil.

Signed at New York, in the county of New York and State of New York, this 11th day of July, A. D. 1921.

GEORGE W. TOWNSEND.